(12) United States Patent
Bakir et al.

(10) Patent No.: US 8,214,373 B1
(45) Date of Patent: Jul. 3, 2012

(54) SYSTEMS AND METHODS FOR ASSIGNMENT OF HUMAN REVIEWERS USING PROBABILISTIC PRIORITIZATION

(75) Inventors: Gökhan Bakir, Zurich (CH); Ashutosh Kulshreshtha, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/030,389

(22) Filed: Feb. 18, 2011

(51) Int. Cl.
*G06F 17/30* (2006.01)
(52) U.S. Cl. ........................................ 707/748; 707/802
(58) Field of Classification Search .................. 707/748, 707/802
See application file for complete search history.

(56) References Cited

U.S. PATENT DOCUMENTS 6,523,019 B1 * 2/2003 Borthwick ...................... 706/45
7,251,696 B1 * 7/2007 Horvitz ........................ 709/228

* cited by examiner

*Primary Examiner* — Cheryl Lewis
(74) *Attorney, Agent, or Firm* — McDonnell Boehnen Hulbert & Berghoff LLP (57) ABSTRACT

The present application discloses systems and methods for using probabilistic prioritization to assign human reviewers to review data stored in or indexed by an information system. Some embodiments include accessing an index of data items, where individual data items have a corresponding probability f of having a problem, a cost to review the data item, a penalty if a problem associated with the data item is not remedied, and a gain if a problem associated with the data item is remedied; identifying a subset of data items having a corresponding f that is greater than or equal to a decision threshold based on the data item's corresponding cost, penalty, and gain; and ranking at least a portion of the subset of data items based at least in part on their corresponding cost, f, and gain.

34 Claims, 5 Drawing Sheets

Article of Manufacture 400

Program Instructions 402

- Access an index of data items stored on tangible, non-transitory computer readable media, wherein data items have a corresponding probability ($f_i$) of having a problem, a cost to review the data item ($cost_i$), a penalty if a problem in the data item is not remedied ($penalty_i$), and a gain if a problem in the data item is remedied ($gain_i$)

- Identify a subset of data items of the index of data items, wherein the subset comprises at least one data item with a corresponding $f_i$ that is greater than or equal to a decision threshold

- Rank at least a portion of the subset of data items based at least in part on the data items' corresponding $cost_i$, $f_i$, and $gain_i$

- Store the ranked portion of the subset of data items in a queue on the tangible, non-transitory computer readable media.

Computer Readable Medium 403

Computer Recordable Medium 404

SYSTEMS AND METHODS FOR ASSIGNMENT OF HUMAN REVIEWERS USING PROBABILISTIC PRIORITIZATION

BACKGROUND

Information systems may rely on data obtained from a variety of information sources. For example, an information system may store or index data obtained from various content providers, such as map data from a geographic information service provider, phone number and address data from a telecommunications service provider, news data from news service providers, or any other data from other types of content providers. An information system may also store or index data generated by actual users of the information system. For example, user-generated data may include photos, videos, product/service reviews, blog postings, or any other data generated by users.

The value of an information system is based at least in part on the accuracy, relevancy, and utility of the data that the information system stores and/or indexes and ultimately provides to a user. For example, if a user receives or finds inaccurate, irrelevant, or offensive data via a particular information system, the user may lose faith in that particular information system and may choose to obtain information from different information systems in the future. Conversely, if a user consistently finds or receives accurate and relevant data via a particular information system, the user is more likely to continue using that particular information system.

Therefore, one goal of an information system operator is to ensure that the data stored in or indexed by the information system is accurate, relevant, or otherwise useful and not offensive. One way to increase the accuracy and relevancy of data stored in or indexed by an information system is to review or moderate the data stored in or indexed by the information system. One way to moderate the data stored in or indexed by an information system is to have humans review the data to determine whether the data is accurate, relevant, or otherwise useful and not offensive. However, having humans review all the data stored in or indexed by a particular information system may be challenging if the information system stores or indexes large volumes of data because of the large number of human reviewers that would be required to review all the data.

SUMMARY

The present application discloses systems and methods for using probabilistic prioritization to assign human reviewers to review data stored in or indexed by an information system.

In one embodiment, individual data items are stored in or indexed by an information system. At least some of the individual data items have (i) a corresponding probability of having a problem, (ii) a corresponding cost to the information system operator to have a human reviewer review the data item, (iii) a corresponding penalty to the information system operator if a problem with the data item is not remedied, and (iv) a corresponding gain to the information system operator if a problem with the data item is remedied by the human reviewer.

An un-reviewed data item's corresponding probability of having a problem can be based on its similarity to one or more reference data items that are similar to the un-reviewed data item. In some embodiments, an un-reviewed data item's probability of having a problem can be regularly or continuously updated based on the outcome of reviewing the one or more reference data items.

An un-reviewed data item's corresponding probability of having a problem can also be based on an indication that the un-reviewed data item may have a problem. Such an indication may be received from either an information system user and/or a computing device configured to analyze data items and assign corresponding probabilities to data items.

A subset of the data items for human review can be identified by determining which individual data items have a corresponding probability of having a problem that is greater than or equal to a corresponding decision threshold for the data item. In some embodiments, the decision threshold for an individual data item can be based on the individual data item's corresponding cost, penalty, and gain. In some embodiments, an individual data item's corresponding decision threshold is equal to its corresponding cost of review divided by the sum of its corresponding penalty and gain.

After identifying a subset of data items for human review, at least a portion of the subset can be prioritized for review based on the data items' corresponding cost, probability of having a problem, and gain. In some embodiments, the prioritization can be based on scores assigned to individual data items. In some illustrative embodiments, the score assigned to a particular data item may be equal to the data item's cost subtracted from the product of the data item's corresponding (i) gain and (ii) probability of having a problem.

In some examples, the disclosed systems and methods may enable information system operators to assign human resources to review and correct data items in a cost-effective, efficient, and timely manner.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Moderation Systems Overview

In general, a moderation system may be employed by an information system operator to enable the information system operator to identify and/or correct problems associated with data stored in or indexed by an information system.

An information system operator may have information indicating that some data stored in or indexed by the information system is definitely problem-free, and the information system operator may have information indicating that other data stored in or indexed by the information system definitely has a problem. However, for some data stored in or indexed by the information system, the information system operator may suspect that the data has a problem or error, and it may be advantageous to assign a human to review the data to identify and/or correct any problems or errors. Thus, one feature of a moderation system as described herein is the assignment of human reviewers to review data that is suspected to have an error or other problem, or to review data that has otherwise not yet been verified.

However, it may become impractical to have human reviewers review all the suspect data or other unverified data. Thus, for larger information systems, certain data can be selected and prioritized to be reviewed and/or corrected by a human reviewer before reviewing other data.

In one example, data items can be selected and prioritized for human review by selecting and/or prioritizing the review of data items based on a cost/benefit analysis. One or more of the following factors may be considered in such a cost/benefit analysis: (i) the cost ($cost_i$) to the information system operator of having a human reviewer review a data item$_i$; (ii) the gain ($gain_i$) to the information system operator of correcting a problem in the data item; and (iii) the penalty ($penalty_i$) to the information system operator of failing to correct a problem in a data item$_i$. Table 1 shows an example conceptual model for evaluating the cost/benefit of selecting and/or prioritizing data items for human review.

TABLE 1

|  | Data item not selected for review $\gamma_i = 0$ | Data item selected for review $\gamma_i = 1$ |
| --- | --- | --- |
| Data item$_i$ is problem-free $\theta_i = 0$ | 0 | cost$_i$ |
| Data item$_i$ has a problem $\theta_i = 1$ | penalty$_i$ | cost$_i$ - gain$_i$ |

As shown in Table 1, the cost/benefit result of not selecting a data item for review when the data item is problem-free is zero. Similarly, the cost/benefit result for selecting a data item for review when the data item is problem-free is the cost to review the data item, i.e. a negative result. Likewise, the cost/benefit result for not selecting a data item that has a problem for review is the penalty for failing to correct the problem with the data item, which is also a negative result. However, the cost/benefit result for selecting and/or correcting a data item with a problem is the cost to review the data item offset by the gain to the information system operator if the problem is corrected. Thus, the cost/benefit result is negative if the cost to review exceeds the gain, but the cost/benefit result is positive if the gain exceeds the cost to review.

Equation 1.1 shows one example of total cost/benefit result when implementing a moderation system to review and correct problems with data items for an information system with N total data items based on the cost/benefit analysis model illustrated in Table 1.

$$\hat{T}[\gamma_1, \ldots \gamma_N] = \sum_{i=1}^{N} \text{penalty}_i \cdot (\theta_i = 1 \wedge \gamma_i = 0) + \\ (\text{cost}_i - \text{gain}_i) \cdot (\theta_i = 1 \wedge \gamma_i = 1) + \text{cost}_i \cdot (\theta_i = 0 \wedge \gamma_i = 1)$$

Equation 1.1

If the information system operator knew $\theta_i$ (i.e., whether data item$_i$ has a problem), then prioritizing data items for human review and/or correction could be based on $\theta_i$. However, at least for some suspect data, $\theta_i$ is not known a priori. In other words, whether a suspect data item$_i$ has a problem is not known for certain until after the suspect data item$_i$ has been reviewed.

However, a probability factor $f_i$ can be introduced. The $f_i$ value corresponds to a likelihood that a particular data item$_i$ has a problem, i.e., $p(\theta_i=1)$, so that it is then possible to estimate the total expected cost/benefit of implementing a moderation system based on the cost/benefit analysis conceptual model illustrated in Table 1. Equation 1.2 introduces the probability factor $f_i$ into Equation 1.1, which is one way to calculate a total estimated cost/benefit result based on individual likelihoods (i.e., $f_i$) that particular data items have a problem.

$$T[\gamma_1, \ldots \gamma_N] = \sum_{i=1}^{N} \text{penalty}_i \cdot (\gamma_i = 0) + \\ (\text{cost}_i - \text{gain}_i) \cdot (\gamma_i = 1) \cdot f_i + \text{cost}_i \cdot (\gamma_i = 1) \cdot (1 - f_i)$$

Equation 1.2

In some cases, a particular data item$_i$ can be selected for review when the cost$_i$ to review the data item is less than the penalty$_i$ for failing to correct a problem with the data item$_i$ (if the data item$_i$ has a problem). This relationship can be expressed in Equation 1.3, which is based on the cost/benefit analysis model illustrated in Table 1.

$$(1-f_i) \cdot \text{cost}_i + f_i \cdot (\text{cost}_i - \text{gain}_i) < f_i \cdot \text{penalty}_i$$

Equation 1.3:

Equation 1.3 can be re-written as equation 1.3.1.

$$f_i > \frac{\text{cost}_i}{\text{penalty}_i + \text{gain}_i}$$

Equation 1.3.1

A decision threshold $\sigma_i$ based on Equation 1.3.1 for an individual data item$_i$ can then be set according to Equation 1.4:

$$\sigma_i = \frac{\text{cost}_i}{\text{penalty}_i + \text{gain}_i}$$

Equation 1.4

Inserting the decision threshold $\sigma_i$ of Equation 1.4 into Equation 1.3 yields an estimate for the expected cost/benefit of reviewing all the data items that have a probability of error $f_i$ that is greater than or equal to their individualized decision thresholds $\sigma_i$, which are based on their corresponding costs, penalties, and gains, as shown in Equation 1.5.

$$T[f] = \sum_{i=1}^{N} \text{penalty}_i \cdot (f_i < \sigma_i) +$$
$$(\text{cost}_i - \text{gain}_i) \cdot (f_i \geq \sigma_i) \cdot (f_i) + \text{cost}_i \cdot (f_i \geq \sigma_i) \cdot (1 - f_i)$$

Equation 1.5

Equation 1.5 can be simplified to Equation 1.5.1.

$$T[f] =$$
$$\sum_{i=1}^{N} f_i \cdot \text{penalty}_i \cdot (f_i < \sigma_i) + (\text{cost}_i - f_i \cdot \text{gain}_i) \cdot (f_i \geq \sigma_i)$$

Equation 1.5.1

Selecting a data item$_i$ for human review to minimize cost and maximize gain amounts to selecting an un-reviewed data item$_i$ that minimizes the result of Equation 1.5.1. The data items selected for review can be prioritized according to a scoring formula based on Equation 1.5.1, such as Equation 1.5.2, for example, where the score$_i$ for a selected data item$_i$ is based on the data item's corresponding cost$_i$, f$_i$, and gain$_i$.

$$\text{score}_i = \text{cost}_i - f_i \cdot \text{gain}_i \quad \text{Equation 1.5.2}$$

Improving the estimate for the probability factor f in Equation 1.5.1 for individual data items may improve the estimated cost/benefit result. Because the selection of data items for review may be based on the estimated cost/benefit result, improving the estimated cost/benefit result may improve the data item selection process. For example, if a group of data items have similar features or attributes, then the results of the human reviews (i.e., $\theta_i=1$ or $\theta_i=0$ from Table 1) for the reviewed data items in the group can be used to refine or revise the estimated f for the un-reviewed data items in the group based on a similarity function sim(data item$_i$, data item$_j$) that approximates the degree of similarity between data item$_i$ and data item$_j$.

An example of using a similarity function is shown in Equation 1.6, which defines a graph Laplacian matrix for the f values of the un-reviewed data items based on their similarity to reviewed data items:

$$S(f) = \sum_{i,j} (f_i - f_j)^2 \text{sim}(\text{data item}_i, \text{data item}_j) = f^T \Delta f \quad \text{Equation 1.6}$$

When $W_{ij}$=sim(data item$_i$, data item$_j$) and $\Delta$=D−W, then $D_{ii}=\Sigma_i W_{ij}$ is the graph Laplacian. And because $\Delta f=0$, Equation 1.6 can be simplified to Equation 1.6.1.

$$f_i = \frac{1}{D_{ii}} \sum_{i \neq j} \text{sim}(\text{data item}_i, \text{data item}_j) f_i \quad \text{Equation 1.6.1}$$

Thus, in the example according to Equation 1.6.1, f$_i$ for a particular un-reviewed data item$_i$ can be determined based on its similarity to reviewed data item$_j$. As more data items are reviewed and determined to either have problems or be problem-free (i.e., $\theta_i=1$ or $\theta_i=0$ from Table 1), then estimates for f$_i$ for the un-reviewed data items (i.e., f$_U$) can be calculated based on the results (i.e., $\theta_i=1$ or $\theta_i=0$) of the reviewed data items (f$_R$) according to Equation 1.7.

$$f_U = -\Delta_{UU}^{-1} \Delta_{UR} f_R \quad \text{Equation 1.7:}$$

By defining $f^{(t)}$ as the state of all the f values at time step t, and by defining $f^{(t+1,\theta k)}=[f_R, f_U^{t+1,\theta k}]$ with the estimates for the f values for the un-reviewed data items (f$_U$), then Equation 1.5.1 can be rewritten as Equation 1.8, which corresponds to one way that the cost/benefit of reviewing all the data items can be calculated as a function of the estimated f values for the un-reviewed data items (f$_U$).

$$T(f_U^{(t+1,k)}) =$$
$$\sum_{i \in U} f_i^{(t+1,\theta k)} \cdot \text{penalty}_i \cdot \left(f_i^{(t+1,\theta k)} < \sigma_i\right) + \text{cost}_i \cdot \left(f_i^{(t+1,\theta k)} \geq \sigma_i\right)$$

Equation 1.8

By estimating the result $\theta_k$ of an un-reviewed data item $f_k^{(t)}$, an estimate of the cost/benefit of reviewing all the data items as a function of the estimated f values for the un-reviewed data items (f$_U$) can then be calculated according to Equation 1.9.

$$\hat{T}(f_U^{(t+1,k)}) = f_k^{(t)} T(f^{t+1,1}) + (1-f_k^{(t)}) T(f^{t+1,0}) \quad \text{Equation 1.9:}$$

Equation 1.9 represents one way to prioritize un-reviewed data items for review by a human reviewer by sorting the un-reviewed data items based on an estimate of $\hat{T}(f_U^{(t+1,k)})$ for each un-reviewed data item.

Over time, Equation 1.9 may improve the estimate for f$_U$ based on the outcomes of the reviews of data items. For larger information systems where computing $f^{(t+1,0/1)}$ and $\Delta$ may be computationally intensive, f$_U$ can alternatively be calculated according to Equation 1.10, where g is an approximation of the f$_i$ values for the un-reviewed data items for $0 < \eta < 1$.

$$f_U = -\eta \cdot \Delta_{UU}^{-1} \Delta_{UR} f_R + (1-\eta) g \quad \text{Equation 1.10:}$$

If a moderation system can receive indications from one or more external sources that a particular un-reviewed data item$_i$ may have a problem, then these external indications can also be considered when determining an f$_i$ value for the un-reviewed data item$_i$. Equation 1.11 is a logarithmic regression function that can be used as one way to determine g(data item$_i$), which corresponds to a data item's likelihood of having a problem based on both (i) external indications that the data item$_i$ may have a problem and (ii) past results of reviewed data items that are similar to the data item$_i$.

$$p(\theta_i = 1) := g(\text{data item}_i) = \frac{e^{\sum_k^r \alpha_k g_k(\text{data item}_i)}}{e^{\sum_k^r \alpha_k g_k(\text{data item}_i)} - 1} \in [0, 1] \quad \text{Equation 1.11}$$

Equation 1.11 uses a linear classifier with coefficients $[\alpha_1, \ldots, \alpha_r]$ and threshold 0 based on training data, such as $[f_U, f_R]$. But because f$_U$ is an approximation and therefore not as reliable as f$_R$, the f$_R$ data can be assigned a heavier weight in the algorithm than the f$_U$ data. Equation 1.12 is a linear classifier that can be used with the logarithmic regression function of Equation 1.11. In Equation 1.12, the f$_R$ training data is assigned weight $C_1$ whereas the f$_U$ training data is assigned weight $C_2$ to account for the difference in reliability between the two data sets.

$$\alpha = \arg\min_{\alpha \in \Re^r} \|\alpha\| + C_1 \sum_{i \in R} \text{penalty}_i \xi_i + C_2 \sum_{i \in U} \text{penalty}_i \xi_i \quad \text{Equation 1.12}$$

$$s.to \quad \alpha^T[g_{1i}, \ldots g_{ki}] \geq 1 - \xi_i \quad (\text{for } f_i \geq \sigma_i)$$

$$\alpha^T[g_{1i}, \ldots g_{ki}] \leq -1 + \xi_i \quad (\text{for } f_i < \sigma_i)$$

2. Moderation System Architecture

Figure 1:
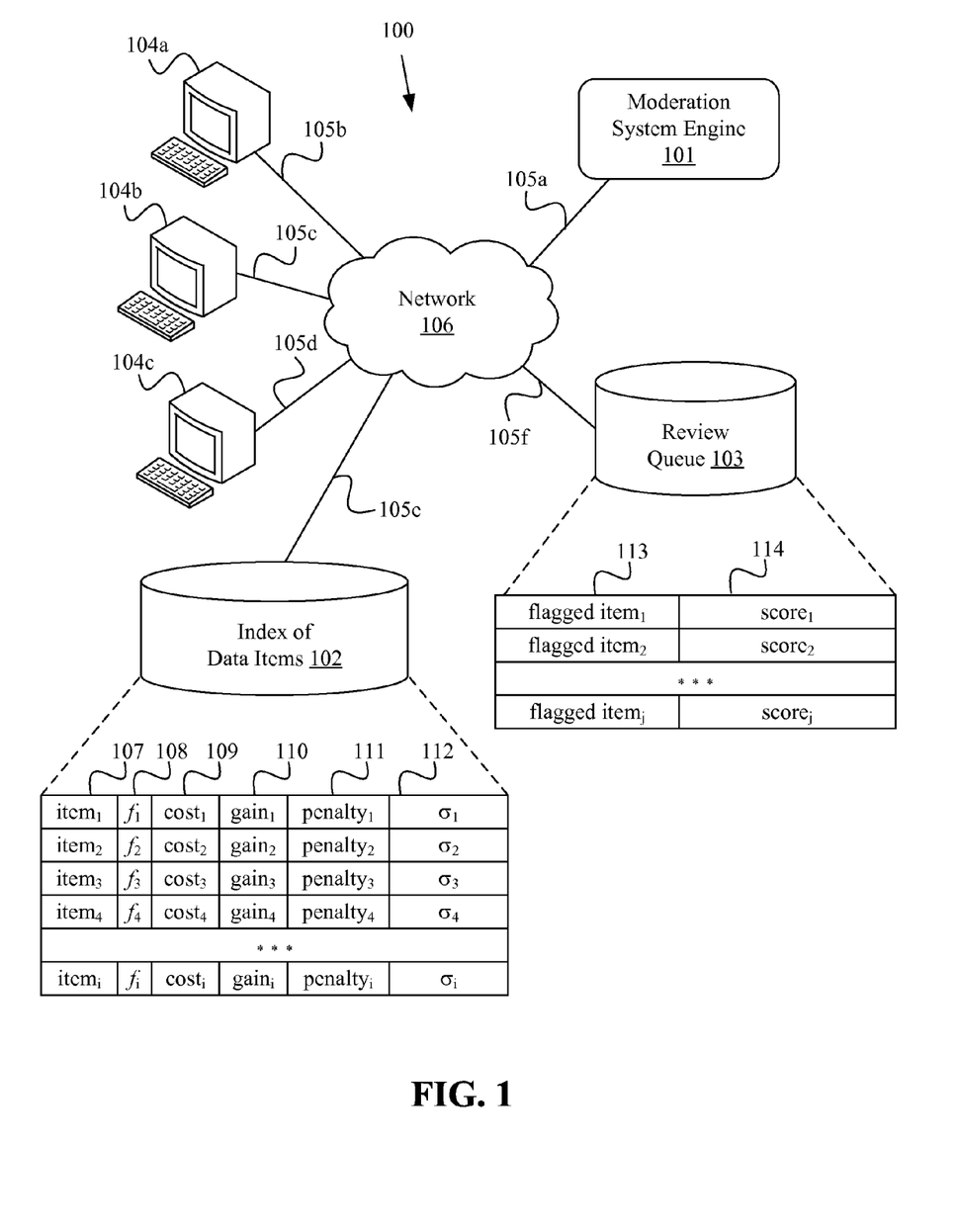
FIG. 1 illustrates certain aspects of one example embodiment of a moderation system configured to prioritize data items for review by human reviewers.

FIG. 1 shows one embodiment of a moderation system 100 configured to prioritize data items for review by human reviewers. In FIG. 1, a moderation system engine 101 is configured to access an index of data items 102 corresponding to an information system, and to generate a review queue 103 of flagged data items 113 to be reviewed by human reviewers via computer terminals 104a, 104b, and 104c.

2.1 Review Terminals

Although FIG. 1 only shows three computer terminals for human reviewers for illustrative purposes, large information systems may have hundreds or thousands of computer terminals for human reviewers. Moreover, computer terminals 104a, 104b, and 104c (or any additional computer terminals) may be any sort of computing device, such as an ordinary laptop computer, desktop computer, network terminal, mobile computing device (e.g., smart phone), etc. In some embodiments, computer terminals 104a-104c may be dedicated to the task of reviewing and correcting the flagged items 113 identified in the review queue 103. In other embodiments, computer terminals 104a-104c may be general purpose computers that are configured to perform a number of tasks and need not be dedicated to the task of reviewing and/or correcting flagged data items 113.

2.2 Moderation System Engine

The moderation system engine 101 of the moderation system 100 is communicatively coupled to the index of data items 102, the review queue 103, and the terminals 104a-104c via network links 105a-105f to network 106. The network 106 may correspond to a local area network, a wide area network, a corporate intranet, the public Internet, or any other type of network configured to provide a communications path between networked computing devices. The network 106 may also correspond to a combination of one or more local area networks, wide area networks, corporate intranets, and/or the public Internet.

The moderation system engine 101 may include one or more computing devices configured to access the index of data items 102 and to generate the review queue 103 of flagged data items 113 to be reviewed by human reviewers via terminals 104a, 104b, and 104c. In some embodiments, the moderation system engine 101 may be a single computing device residing in a single computing center, or for large information systems, the moderation system engine 101 may include multiple computing devices in a single computing center, or even multiple computing devices located in multiple computing centers located in diverse geographic locations as described in more detail herein.

2.3 Index of Data Items

The index 102 of data items contains metadata and/or other information associated with or related to each of the data items 107 in the index 102. In some embodiments, the index 102 may store the actual data items 107. In other embodiments, the index 102 may be a list of pointers to network locations where the data items 107 can be found. The index 102 can store as much or as little metadata associated with each of the data items 107 as required to perform the functions described herein. The term "index" is used here in a general conceptual sense, and the disclosed embodiments are not limited to any particular type of index structure or format.

In some embodiments, the index 102 may be encoded as computer readable information stored in tangible computer readable media (or computer readable storage media) and accessible by the moderation system engine 101, the review terminals 104a, 104b, and 104c, and/or other computing devices. In some embodiments, the index 102 may be a single disk drive or other tangible storage media, or for large information systems where a large and scalable moderation system might be advantageous, the index 102 may be implemented on multiple disk drives or other tangible storage media located at one or more diverse geographic locations as described in more detail herein.

The data items 107 in the index 102 can be any type of data item that is stored in or indexed by an information system. The types of data items stored in or indexed by an information system may depend on the type and scope of a particular information system. For example, the types of data items indexed by an Internet-based information system may be different than the types of data items indexed by a particular corporation's internal intranet-based information system. Examples of the types of data items that may be stored in or indexed by an Internet-based information system include, but are not limited to: (i) a video or audio file; (ii) an image file; (iii) a website address; (iv) a local business listing with a phone number, street address, and/or website address for the business; (v) an intranet or Internet blog posting; (vi) a product or service review; and/or (vii) geographic information related to locations on a map, e.g., businesses, roads, lakes, parks, train stations, points of interest, etc. Examples of the types of data items that may be stored in or indexed by an intranet-based information system may include, but are not limited to: (i) customer contact information, such as phone numbers, addresses, names, etc.; (ii) billing and accounting records; (iii) manufacturing information; (iv) inventory information; (v) product specifications; and/or (vi) employee information. The examples listed above are merely for illustrative purposes and not meant to preclude other types of data items that might be stored in or indexed by any particular Internet-based or intranet-based information system or any other type of information system.

2.3.1 Cost for a Human Reviewer to Review a Data Item

The $cost_i$ 109 for a human reviewer to review a particular data $item_i$ generally corresponds to the cost (in time or money) to an information system operator to have a human reviewer review the particular data $item_i$ and to determine whether the data $item_i$ has a problem. In some cases, the cost to review the particular data item may also include the cost to correct an identified problem. The cost to review a particular data item may vary depending on the type of data item and/or the size of the data item. For example, a video may have a higher cost to review than a photograph. Similarly, verifying a street address for a local restaurant may have a lower cost to review than verifying the name of a park identified on a map in a foreign country because the street address could be quickly verified by calling the local restaurant whereas verifying the name of the park may require multiple phone calls or letters if it is unclear what person or government entity is able to verify the name of the park.

In some embodiments, the cost to review a particular item may be based on the type of data item, the cost to review similar or related data items, or other cost estimates. For example, an information system operator may estimate the average cost to review a particular type of data item and assign the same review cost to all the data items of that particular type. Alternatively, or additionally, the cost to review one particular data item$_i$ may be based on the actual cost (perhaps measured in time and multiplied by a dollar per hour rate) that was required to review a similar or related data item$_j$. In still other embodiments, the cost to review a particular data item may be generalized to a high/medium/low indicator (or other similar gradation, e.g., a scale of 1-10, etc., where 1 is a low cost and 10 is a high cost, or vice versa).

2.3.2 Gain when a Problem is Corrected

The gain$_i$ 110 for a particular data item$_i$ corresponds to the expected benefit to the information system operator if a human reviewer identifies and corrects a problem associated with the particular data item$_i$. The expected benefit to the information system operator may be financial, e.g., for example, forecasted revenue associated with advertising based on the data item. Alternatively, or additionally in some cases, the expected benefit may also be based on increased goodwill and consumer loyalty that accrues to the information system operator when an information system user accesses an accurate, relevant, and useful data item via the information system. In some embodiments, the gain for a particular data item may be an absolute dollar value. In other embodiments, the gain for a particular data item may be a score that corresponds to a dollar value or a range of dollar values. In still other embodiments, the gain for a particular data item may be generalized to a high/medium/low indicator (or other similar gradation, e.g., a scale of 1-10, etc., where 1 is a low gain and 10 is a high gain, or vice versa).

In some embodiments, the gain may also be based on the prominence or importance of a particular data item, where the gain for correcting a problem associated with a prominent or important data item is higher than the gain for correcting a problem associated with a less prominent or less important data item.

For example, an internet address of a major online retailer may be a more prominent data item than the name of a small local park on a map. As a result, correcting a problem with the internet address of a major online retailer may result in a greater gain to the information system operator than correcting the name of a small local park on a map because: (i) correcting the problem associated with the major online retailer may result in higher advertising revenue to the information system operator when information system users click on the internet address to visit the online retailer's site; and (ii) more information system users are likely to experience the problem associated with a major online retailer than the problem associated with small local park name, and thus, correcting the problem associated with the major online retailer will have a greater impact on goodwill and user loyalty than correcting the problem associated with the park name on the map. In some embodiments, the prominence of a particular data item can be based on a prominence score, e.g., a high/medium/low indicator or other gradated score (e.g., a scale of 1-10, etc.).

Similarly, the phone number or location of an emergency room on a map may be considered more important than the phone number or location of a local restaurant. As a result, correcting a problem associated with the emergency room location and contact information may result in a greater gain to the information system operator in terms of increased user goodwill than correcting a problem associated with the location or contact information restaurant. In some embodiments, the importance of a data item can be based on an importance score, e.g., a high/medium/low indicator or other gradated score (e.g., a scale of 1-10, etc.).

2.3.3 Penalty for Failing to Correct a Problem

The penalty$_i$ 111 for a particular data item$_i$ corresponds to an expected detriment to the information system operator if a human reviewer fails to correct a problem associated with the particular data item$_i$. Similar to gain, the penalty can be financial and/or decreased goodwill. For example, in the context of an Internet-based information system, a financial penalty for an incorrect website address might be based on lost advertising revenue. Similarly, in the context of an intranet-based information system, a financial penalty for a problem in a billing system might be based on the cost of receiving a delayed payment by a customer of the company operating the intranet-based information system. Likewise, an information system operator may lose goodwill and user/customer loyalty caused by the incorrect or inaccurate information.

In some embodiments, the penalty for a particular data item may be an absolute dollar value. In other embodiments, the penalty for a particular data item may be a score that corresponds to a dollar value or a range of dollar values. In still other embodiments, the penalty for a particular data item may be generalized to a high/medium/low indicator (or other gradations, e.g., a scale of 1-10, etc.).

In some embodiments, the penalty for not correcting a potential problem in a particular data item may be additionally based on a severity of the potential problem with the particular data item. For example, a rude or obscene product or service review may not be as severe of a problem as an incorrect phone number or website address for a business listing. In some embodiments, the severity of a potential problem can be based on a severity score, e.g., a high/medium/low indicator or other gradated score (e.g., a scale of 1-10, etc.).

In some embodiments, at least some individual data items may also have a corresponding penalty based on one or more of a severity score, a prominence score, and an importance score. As described earlier, the importance of a particular data item can be based on an importance score, e.g., a high/medium/low indicator or other gradated score (e.g., a scale of 1-10, etc.), and the prominence of a particular data item can be based on an prominence score, e.g., a high/medium/low indicator or other gradated score (e.g., a scale of 1-10, etc.).

2.3.4 Probability that an Un-Reviewed Data Item has a Problem

At least some of the data items 107 in the index 102 may have a corresponding probability $f_i$ 108 of having a problem. The probability $f_i$ that a particular un-reviewed data item$_i$ has a problem corresponds to the likelihood that the data item$_i$ has some sort of error, deficiency, or characteristic that makes the data item in some way inaccurate, irrelevant, offensive, or otherwise not useful to an information system user, e.g., some aspect of the data item is incomplete, corrupted, inaccurate, incorrect, unformatted or improperly formatted, stored in an incorrect place, incorrectly indexed, improperly associated with other data, or any other problem that may occur with data items in an information system.

For example, a problem based on an inaccuracy could be an incorrect phone number, street address, or Internet address for a local business. An example of a problem based on irrelevance could be one or more irrelevant key words or content related to a data item that may cause an online advertising system to associate irrelevant advertisements with the data item. Additionally, a data item may be deemed offensive if its content is objectionable, insulting, or distasteful to one or more users of the information system.

In some embodiments, a data item's corresponding probability f of having a problem may be based on an indication received from a computing system configured to analyze data items and assign corresponding f values to individual data items. For example, in some embodiments, the moderation system engine 101 may be configured to analyze a first un-reviewed data item and/or metadata associated with the first un-reviewed data item, and to assign a corresponding $f_{first}$ to the first un-reviewed data item based on one or more similarities between the first un-reviewed data item and a reference data item that has already been reviewed and determined to definitely have a problem (or not have a problem), i.e. $\theta_{reference}=1$ or $\theta_{reference}=0$. In other embodiments, a separate computing system may analyze the first un-reviewed data item and/or metadata associated with the first un-reviewed data item, and assign a corresponding $f_{first}$ to the first un-reviewed data item based on its similarity to the previously-reviewed reference data item. For example, the moderation system engine 101 or a separate computing system may analyze the content or characteristics of the data items, metadata associated with the data items, (e.g., author, source, file size, file type, creation date, etc.), and/or review results to determine a degree of similarity between two or more data items.

A data item's corresponding f value may also be based on an indication of a problem received from a user of the information system. For example, an information system user may believe that an address corresponding to a local business is incorrectly listed on a map. In such an instance, the information system user can identify the address associated with the business as potentially having a problem, and tag the address in the information system accordingly. Once a data item has been identified as potentially having a problem, the data item's corresponding f value may be increased. If multiple users identify the same data item has potentially having a problem, then the data item's corresponding f value may be increased even further, which increases the likelihood that the moderation system 100 will select that particular data item for review and/or correction by a human reviewer.

In still other embodiments, a particular data item's corresponding f value may be based on some combination of an indication received from a user and an indication received from a computing device configured to assign corresponding f values to data items. In these embodiments, a weight given to the indication received from the user and/or the indication received from the computing device may be based on a level of confidence associated with the indication. For example, an indication received from an unregistered user of the information system may be afforded less weight than an indication received from a registered user of the information system. Similarly, for indications determined by and/or received from a computing device, an indication based on the similarity between the data item and a reviewed reference data item might be given more weight than an indication based on the similarity between the data item and an un-reviewed reference data item.

Regardless of whether a data item's corresponding f value stored in the index 102 is received from the moderation system engine 101, a separate computing system, or from an information system user, the f values for individual data items can change over time as similar or related data items are determined to have problems or not have problems. And because the f value for an individual data item may change over time, other attributes of the data item that are based on the data item's corresponding f value may also change over time. As a result, the moderation system engine 101 can be configured to update and/or revise the review queue 103 on a regular or ongoing basis so that the review queue is populated and prioritized based on current information. For example, in some embodiments, the moderation system engine 101 may be configured to update or revise the review queue 103 on a regular schedule, such as every few minutes or few hours. In other embodiments, the moderation system engine 101 may be configured to update or revise the review queue 103 in substantially real-time as information about the type and nature of actual and suspected problems with data items becomes available.

2.3.4 Decision Threshold

In some embodiments, some of the data items 107 in the index 102 may also have a corresponding decision threshold $\sigma_i$ 112 that is particular to the individual data item. Other embodiments may use a fixed decision threshold that is common across all the data items 107 in the index 102. In other embodiments, some of the data items 107 may have a corresponding individual decision threshold 112 that is particular to the data item whereas other data items may have a default or global decision threshold. In the embodiments where at least some of the data items 107 have an individualized corresponding decision threshold, a particular data item's corresponding decision threshold may be calculated according to Equation 2.1.

$$\sigma_i = \frac{cost_i}{penalty_i + gain_i} \quad \text{Equation 2.1}$$

In equation 2.1, $\sigma_i$ is the individual decision threshold for data item$_i$, cost$_i$ is the cost for a human reviewer to review data item$_i$, penalty$_i$ is the penalty to the system operator if data item$_i$ has a problem that is not corrected, and gain$_i$ is the gain to the system operator if a problem with data item$_i$ is corrected.

2.4 Review Queue

The review queue 103 contains a list of flagged items 113 for human review. In some embodiments, the review queue 103 may store the actual flagged items 113. In other embodiments, the review queue 103 may be a list of pointers to network locations where the flagged data items 113 can be found. The review queue 103 can store as much or as little metadata associated each of the flagged data items 113 as required to perform the functions described herein. The term "queue" is used here in a general conceptual sense, and the disclosed embodiments are not limited to any particular type list structure, index structure, or other data format.

Because the flagged items 113 are selected from the items 107 in the index 102, an individual flagged item may have a corresponding probability of having a problem, a corresponding cost to review, a corresponding gain if a problem is identified and corrected, a corresponding penalty if a problem is not corrected, and a corresponding decision threshold. However, in some embodiments, the corresponding data attributes may not be reproduced or stored in the review queue 103 if the corresponding data attributes can be accessed in the index 102. In other embodiments, however, it may be desirable to reproduce those attributes for each flagged item in the review queue 103.

In some embodiments, the review queue 103 may be encoded as computer readable information stored in tangible computer readable media (or computer readable storage media) and accessible by the moderation system engine 101, the review terminals 104a, 104b, and 104c, and/or other computing devices. In some embodiments, the review queue 103 may be a single disk drive or other tangible storage media, or for large information systems where a large and scalable moderation system might be advantageous, the review queue 103 may be implemented via multiple disk drives or other tangible storage media located at one or more diverse geographic locations as will be described in more detail herein.

2.5 Selecting and Prioritizing Data Items for Review

The moderation system engine 101 may be configured to access the index 102 of data items 107 and to generate the review queue 103 of flagged data items 113 to be reviewed by human reviewers via terminals 104a, 104b, and 104c. The flagged data items 113 in the review queue 103 may include one or more data items 107 selected from the index 102 by the moderation system engine 101 for human review.

In one embodiment, the moderation system engine 101 may be configured to access items 107 in the index 102, identify items for review, and write/store the identified items into the review queue 103 as flagged items 113 for human review. The flagged items 113 in the review queue 103 may include data items 107 from the index 102 that have a corresponding f value that is greater than or equal to the item's corresponding decision threshold value. In some embodiments, a data item's corresponding threshold value may be based on the data item's corresponding cost, gain, and penalty. In one embodiment, a data item's corresponding threshold may be calculated according to Equation 2.1 as described earlier.

In addition to identifying data items for review by a human reviewer, in some embodiments, the moderation system engine 101 may also prioritize the flagged items 113 in the review queue 103 for review. In one embodiment, the moderation system engine 101 may assign corresponding scores 114 to individual flagged items 113. In some embodiments, a flagged item's score may be based on the item's corresponding f value, cost, and gain. For the embodiments where an individual flagged item's score is based at least in part on the item's corresponding f value, the flagged item's corresponding score may change as the flagged item's corresponding f value changes. In one embodiment, a flagged item's corresponding score may be calculated according to Equation 2.2.

$$score_i = cost_i - f_i \cdot gain_i \qquad \text{Equation 2.2:}$$

In equation 2.2, $score_i$ is the score assigned to flagged $item_i$, $cost_i$ is the cost to have a human review flagged $item_i$, $f_i$ is the probability that there is a problem with flagged $item_i$, and $gain_i$ is the gain to the information system operator if a problem with flagged $item_i$ is remedied.

In embodiments where the flagged items' 113 corresponding scores 114 are calculated according to Equation 2.2, the moderation system engine 101 may rank at least a portion of the flagged items 113 from the lowest score to the highest score. In embodiments where the flagged items 113 are ranked according to scores based on Equation 2.2, flagged items with lower scores may be selected for review before selecting flagged items with higher scores for review because correcting problems with flagged items having lower scores may provide greater gain (or avoid greater penalties) per cost of review than correcting problems with flagged items having higher scores.

Additionally, as described above, the $f_i$, $cost_i$, $gain_i$, $penalty_i$, and $\sigma_i$ attributes of a particular un-reviewed data $item_i$ in the index 102 may change over time as other data items related and/or similar to the particular un-reviewed data $item_i$ are reviewed and determined to have problems or not have problems. Because these attributes may be dynamic for the un-reviewed data items, some embodiments of the moderation system engine 101 may be able to dynamically add or remove data items to the review queue 103 of flagged data items 113 and/or move individual flagged data items up or down in priority in the review queue 103 in response to determining whether related and/or similar items have problems or do not have problems. As a result, some embodiments of moderation system 100 may enable the information system operator to assign human reviewer resources in an efficient and timely manner.

3. Computing Device Architecture

Figure 2A:
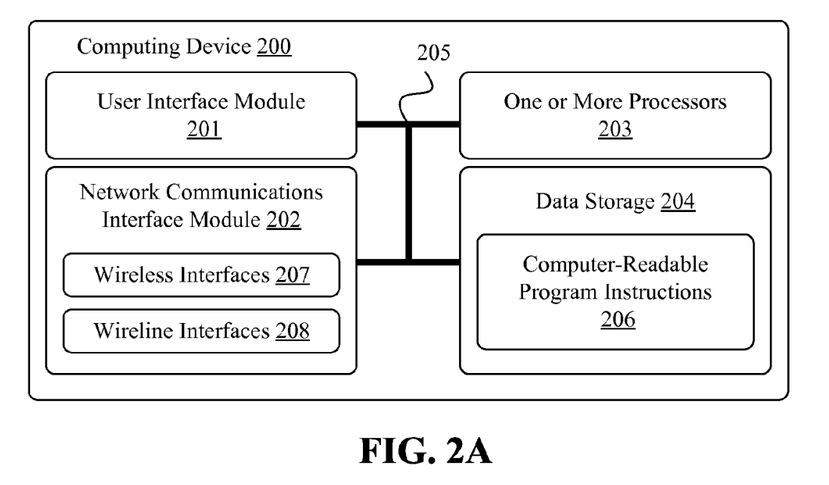
FIG. 2A shows one embodiment of an example computing device that may be used in the moderation system of FIG. 1.

FIG. 2A is a block diagram of an example of a computing device 200 that can be configured to perform one or more functions of the moderation system engine 101. The computing device 200 may include a user interface module 201, a network-communication interface module 202, one or more processors 203, and data storage 204, all of which may be linked together via a system bus, network, or other connection mechanism 205.

The user interface module 201 may be operable to send data to and/or receive data from external user input/output devices. For example, the user interface module 201 may be configured to send/receive data to/from user input devices such as a keyboard, a keypad, a touch screen, a computer mouse, a track ball, a joystick, and/or other similar devices, now known or later developed. The user interface module 201 may also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 may also be configured to generate audible output(s), such as a speaker, speaker jack, audio output port, audio output device, earphones, and/or other similar devices, now known or later developed.

The network-communications interface module 202 may include one or more wireless interfaces 207 and/or wireline interfaces 208 that are configurable to communicate via a network, such as the network 106 shown in FIG. 1. The wireless interfaces 207 may include one or more wireless transceivers, such as a Bluetooth transceiver, a Wi-Fi transceiver, a WiMAX transceiver, and/or other similar type of wireless transceiver configurable to communicate via a wireless network. The wireline interfaces 208 may include one or more wireline transceivers, such as an Ethernet transceiver, a Universal Serial Bus (USB) transceiver, or similar transceiver configurable to communicate via a twisted pair wire, a coaxial cable, a fiber-optic link or a similar physical connection to a wireline network.

In some embodiments, the network communications interface module 202 may be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms may be used as well or in addition to those listed herein to secure (and then decrypt/decode) communications.

The one or more processors 203 may include one or more general purpose processors (e.g., microprocessors manufactured by Intel or Advanced Micro Devices) and/or one or more special purpose processors (e.g., digital signal processors, application specific integrated circuits, etc.). The one or more processors 203 may be configured to execute computer-readable program instructions 206 that are contained in the data storage 204 and/or other instructions as described herein.

The data storage 204 may include one or more computer-readable storage media that can be read or accessed by at least one of the processors 203. The one or more computer-readable storage media may include volatile and/or non-volatile storage components, such as optical, magnetic, organic or other memory or disc storage, which can be integrated in whole or in part with at least one of the processors 203. In some embodiments, the data storage 204 may be implemented using a single physical device (e.g., one optical, magnetic, organic or other memory or disc storage unit), while in other embodiments, the data storage 204 may be implemented using two or more physical devices.

The data storage 204 may include computer-readable program instructions 206 and perhaps additional data. In some embodiments, the data storage 204 may additionally include storage required to perform at least part of the herein-described techniques and/or at least part of the functionality of the herein-described devices and networks.

4. Scalable Moderation System Architecture

As mentioned above, the moderation system engine 101 may include one or more computing devices 200 configured to access the index of data items 102 and to generate the review queue 103 of flagged data items 113 to be reviewed by human reviewers via terminals 104a, 104b, and 104c. In some embodiments, the moderation system engine 101 may be a single computing device 200 residing in a single computing center, or for large information systems, the moderation system engine 101 may include multiple computing devices like computing device 200. In some embodiments where the moderation system engine 101 includes multiple computing devices, all the computing devices may be located in a single computing center. In other embodiments, the multiple computing devices of the moderation system engine 101 may be located in multiple diverse geographic locations as described herein.

Figure 2B:
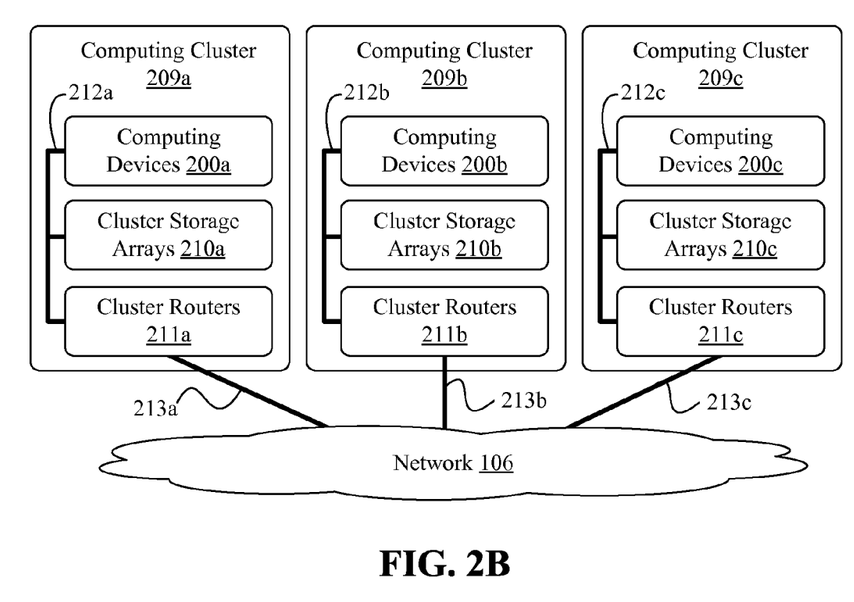
FIG. 2B shows an embodiment of an example scalable moderation system architecture including a plurality of computing devices, storage arrays, and network routers.

FIG. 2B shows one embodiment of the moderation system 101 that includes three computing clusters 209a, 209b, and 208c. The computing cluster 209a includes multiple computing devices 200a, multiple cluster storage arrays 210a, and multiple cluster routers 211a connected by a local cluster network 212a. Similarly, the computing cluster 209b includes multiple computing devices 200b, multiple cluster storage arrays 210b, and multiple cluster routers 211b connected by a local cluster network 212b. Likewise, the computing cluster 209c includes multiple computing devices 200c, multiple cluster storage arrays 210c, and multiple cluster routers 211c connected by a local cluster network 212c.

In some embodiments, each of the computing clusters 209a, 209b, and 209c may have an equal number of computing devices, an equal number of cluster storage arrays, and an equal number of cluster routers. In other embodiments, however, each computing cluster may have different numbers of computing devices, different numbers of cluster storage arrays, and different numbers of cluster routers. The number of computing devices, cluster storage arrays, and cluster routers in each computing cluster may depend on the computing task or tasks assigned to each computing cluster.

In computing cluster 209a, for example, the multiple computing devices 200a can be configured to perform various computing tasks of the moderation system engine 101 shown in FIG. 1. In one embodiment, the various functionalities of the moderation system engine 101 can be distributed among the multiple computing devices 200a. For example, some computing devices may be configured to access the index 102 and identify or select data items for review. Other computing devices may be configured to write the selected data items to the review queue 103. Other computing devices may be configured to prioritize and rank the flagged items 113 in the review queue 103 and/or perform other maintenance operations and updates for the review queue 103. And still other computing devices may be configured to assign corresponding probabilities $f_i$ of problems to individual data items in the index 102 and/or perform other maintenance operations and updates to corresponding costs, penalties, and decision thresholds for the data items 107 index 102. Computing devices 200b and 200c in computing clusters 209b and 209c may be configured similarly to computing devices 200a in computing cluster 209a.

In some embodiments, computing devices 200a in computing cluster 209a may be configured to perform one or more functions of the moderation system engine 101, computing devices 200b in computing cluster 209b may be configured to perform one or more other functions of the moderation system 101, and computing devices 200c in computing cluster 209c may be configured to perform still one or more different functions of the moderation system 101. For example, computing devices 200a in computing cluster 209a may be configured to access the index 102 and identify or select data items for review. Computing devices 200b in computing cluster 209b may be configured to write the selected data items to the review queue 103 and to prioritize and rank the flagged items 113 in the review queue 103 and/or perform other maintenance operations and updates for review queue 103. And computing devices 200c in computing cluster 209c may be configured to assign corresponding probabilities $f_i$ of problems to individual data items in the index 102 and/or perform other maintenance operations and updates to corresponding costs, penalties, and decision thresholds for the data items 107 index 102.

In some embodiments, computing tasks for the moderation system engine 101 can be distributed across the multiple computing devices 200a, 200b, and 200c in computing clusters 209a, 209b, and 209c based at least in part on the processing requirements of the different moderation system engine 101 functions, the processing capabilities of the computing devices that comprise the moderation system engine 101, the latency of the network links between the computing devices in each computing cluster and between the computing clusters themselves, and/or other factors that may contribute to the cost, speed, fault-tolerance, resiliency, efficiency and/or other design goals of the moderation system architecture.

The cluster storage arrays 210a, 210b, and 210c of the computing clusters 209a, 209b, and 209c may be data storage arrays that include disk array controllers configured to manage read and write access to groups of hard disk drives. The disk array controllers, alone or in conjunction with the moderation system engine 101, may also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of the moderation system engine 101 can be distributed across the computing devices 200a, 200b, and 200c of computing clusters 209a, 209b, and 209c, various active portions and/or backup/redundant portions of the index of data items 102 and the review queue 103 can be distributed across the multiple cluster storage arrays 210a, 210b, and 210c of computing clusters 209a, 209b, and 209c. For example some cluster storage arrays may be configured to store portions of the index 102, some cluster storage arrays may be configured to store backup versions of the index 102, and some cluster storage arrays may be configured to store the review queue 103 or backup/redundant versions of the review queue 103.

In some embodiments, the data in the index 102 and the review queue 103 can be distributed across the multiple cluster storage arrays 210a, 210b, and 210c in computing clusters 209a, 209b, and 209c based at least in part on the data storage requirements of the index 102 and the review queue 103, the data storage and data access speed of the cluster storage arrays, the latency of the network links between the computing devices in each computing cluster and between the computing clusters themselves, and/or other factors that may contribute to the cost, speed, fault-tolerance, resiliency, efficiency and/or other design goals of the moderation system architecture.

The cluster routers 211a, 211b, and 211c in computing clusters 209a, 209b, and 209c may include networking equipment configured to provide internal and external communications for the computing clusters. For example, the cluster routers 211a in computing cluster 209a may include one or more internet switching and routing devices configured to provide (i) local area network communications between the computing devices 200a and the cluster storage arrays 201a via the local cluster network 212a, and (ii) wide area network communications between the computing cluster 209a and the computing clusters 209b and 209c via the wide area network connection 213a to network 106. Cluster routers 211b and 211c can include network equipment similar to the cluster routers 211a, and cluster routers 211b and 211c can perform similar networking functions for computing clusters 209b and 209b that cluster routers 211a perform for computing cluster 209a.

In some embodiments, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of local networks 212a, 212b, 212c, the latency, throughput, and cost of wide area network links 213a, 213b, and 213c, and/or other factors that may contribute to the cost, speed, fault-tolerance, resiliency, efficiency and/or other design goals of the moderation system architecture.

5. Moderation System Algorithms and Processes

Figure 3A:
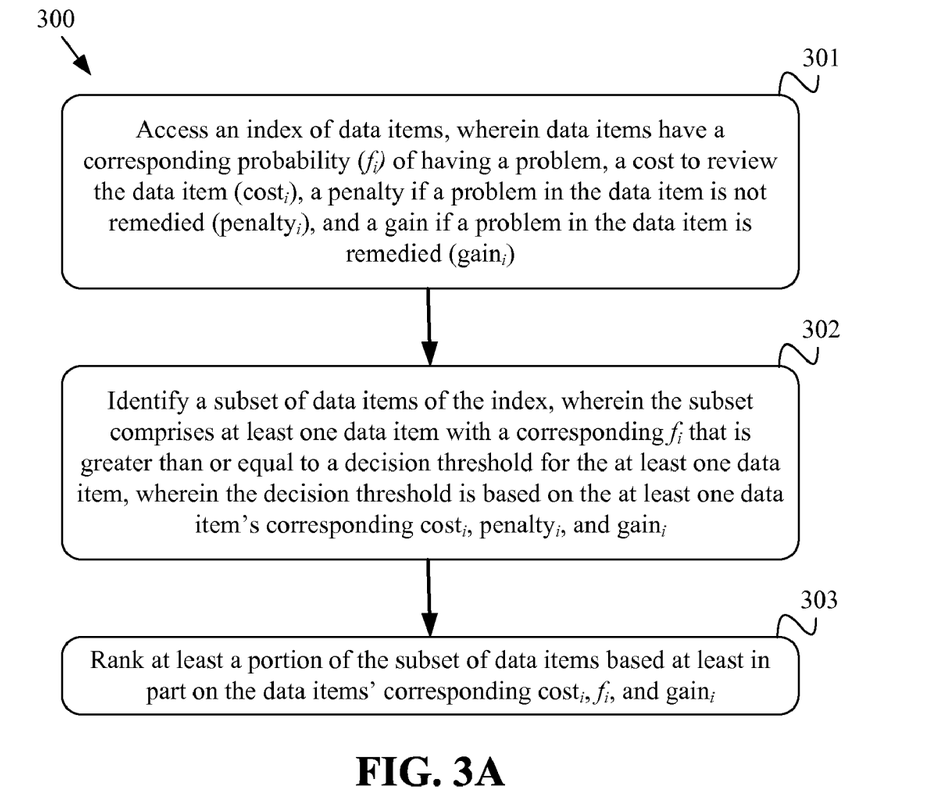
FIG. 3A shows a flow chart according to one example embodiment of a method for prioritizing data items for review by human reviewers.

FIG. 3A shows a method 300 according to one embodiment. For this and other processes and methods disclosed herein, the flowcharts show functionality and operation of one possible implementation of the disclosed embodiments. In this regard, each block may represent a module, a segment, or a portion of program code, which may include one or more instructions executable by a processor for implementing specific logical functions, actions, or steps in the method. The program code may be stored on any type of computer readable medium such as a storage device including a disk or hard drive or other storage medium. The computer readable medium may also include non-transitory computer readable media such as computer-readable media that stores data for short periods of time like register memory, processor cache, and Random Access Memory (RAM). The computer readable media may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally, each functional block in the disclosed methods may represent circuitry that can be configured to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At step 301, an index of data items stored on tangible, non-transitory computer readable media is accessed. Individual data items in the index may have one or more of a corresponding probability ($f_i$) of having a problem, a cost to review the data item ($cost_i$), a penalty if a problem in the data item is not remedied ($penalty_i$), and a gain if a problem in the data item is remedied ($gain_i$).

At step 302, a subset of data items of the index of data items is identified. The identified subset includes data items with a corresponding $f_i$ that is greater than or equal to (or approximately greater than or approximately equal to) a decision threshold for the individual data item. The decision threshold for the individual data item may be based on the individual data item's corresponding $cost_i$, $penalty_i$, and $gain_i$. In one embodiment, an individual data item's corresponding decision threshold may be equal to the data item's $cost_i$ divided by the sum of its $penalty_i$ and $gain_i$.

At step 303, at least a portion of the subset of data items are ranked. In one embodiment, the ranking may be based at least in part on the corresponding $cost_i$, $f_i$, and $gain_i$ of the individual data items.

Figure 3B:
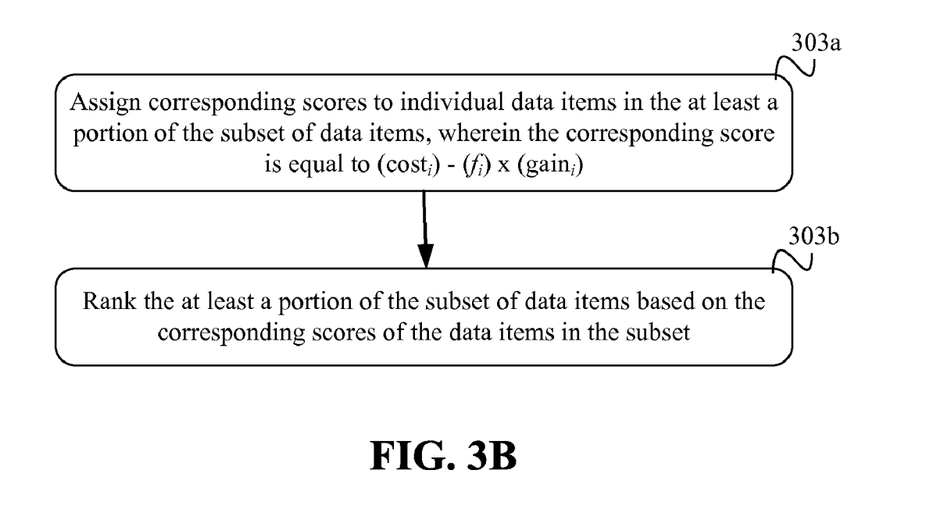
FIG. 3B shows a flow chart according to one alternative embodiment of a method for prioritizing data items for review by human reviewers.

FIG. 3B shows an example embodiment where step 303 includes steps 303a and 303b. At step 303a, a corresponding score is assigned to individual data items in the at least a portion of the subset of data items. The individual data item's corresponding score may be equal to the data item's corresponding $cost_i$ subtracted from the product of the data item's corresponding $f_i$ and $gain_i$. At step 303b, at least a portion of the set of data items is ranked based on the corresponding scores of the individual data items.

Figure 3C:
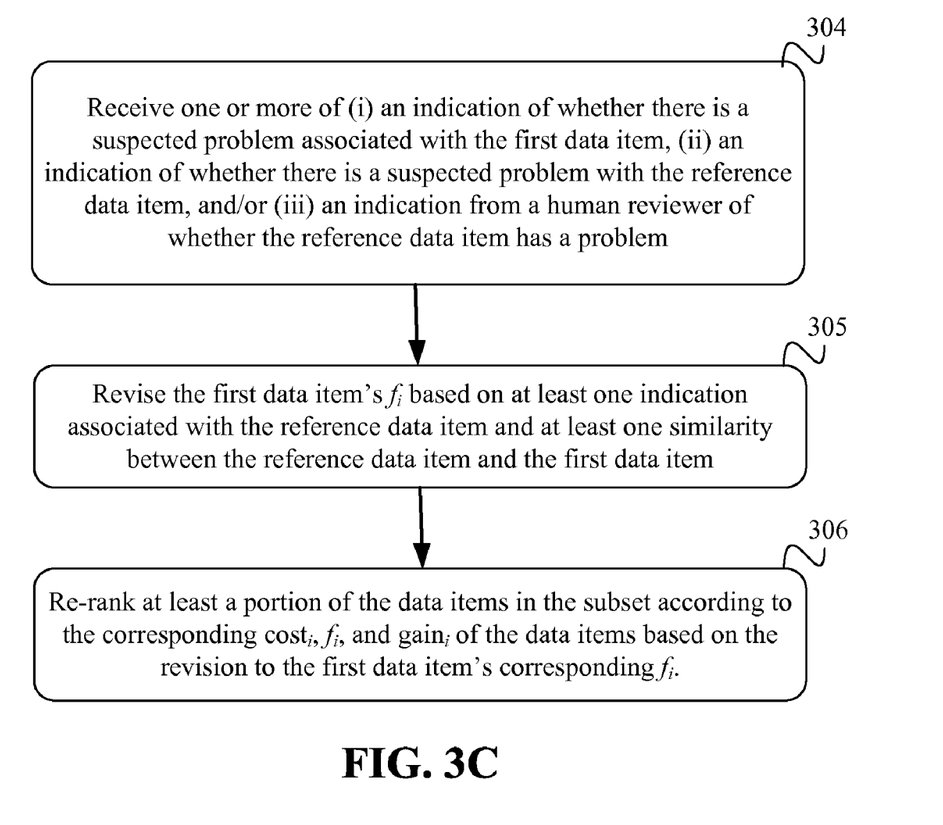
FIG. 3C shows a flow chart according to another alternative embodiment of a method for prioritizing data items for review by human reviewers.

FIG. 3C shows another example embodiment of additional or alternate steps of the method shown in FIG. 3A. In the embodiment shown in FIG. 3C, the method 300 additionally includes steps 304-306. At step 304, one or more indications are received. The indication may be at least one of: (i) an indication of whether there is a suspected problem associated with the first data item; (ii) an indication of whether there is a suspected problem with the reference data item; and/or (iii) an indication that a human reviewer has determined that the reference data item does or does not have a problem.

At step 305, and in response to receiving the indication at step 304, a first data item's corresponding $f_i$ is revised based on one or more similarities between the reference data item and the first data item. In one embodiment, the one or more similarities between the reference data item and the first data item are based on similarities between metadata associated with the first data item and metadata associated with the reference data item.

Although steps 304 and 305 describe revising a first data item's corresponding probability of error based on the first data item's similarity to a reference data item, steps 304 and 305 could be modified to alternatively (or additionally) revise the first data item's corresponding cost, gain, and/or penalty based on the reference data item's cost, gain, and/or penalty and some degree of similarity between the first data item and the reference data item.

At step 306, at least a portion of the data items in the earlier subset of data items identified at step 302 are re-ranked according to their corresponding $cost_i$, $f_i$, and $gain_i$ based on the revision to the first data item's corresponding $f_i$. In one embodiment, the ranking may be based on corresponding scores assigned to individual data items. For example, the score could be the data item's corresponding $cost_i$ subtracted from the product of the data item's corresponding $f_i$ and $gain_i$.

Figure 4:
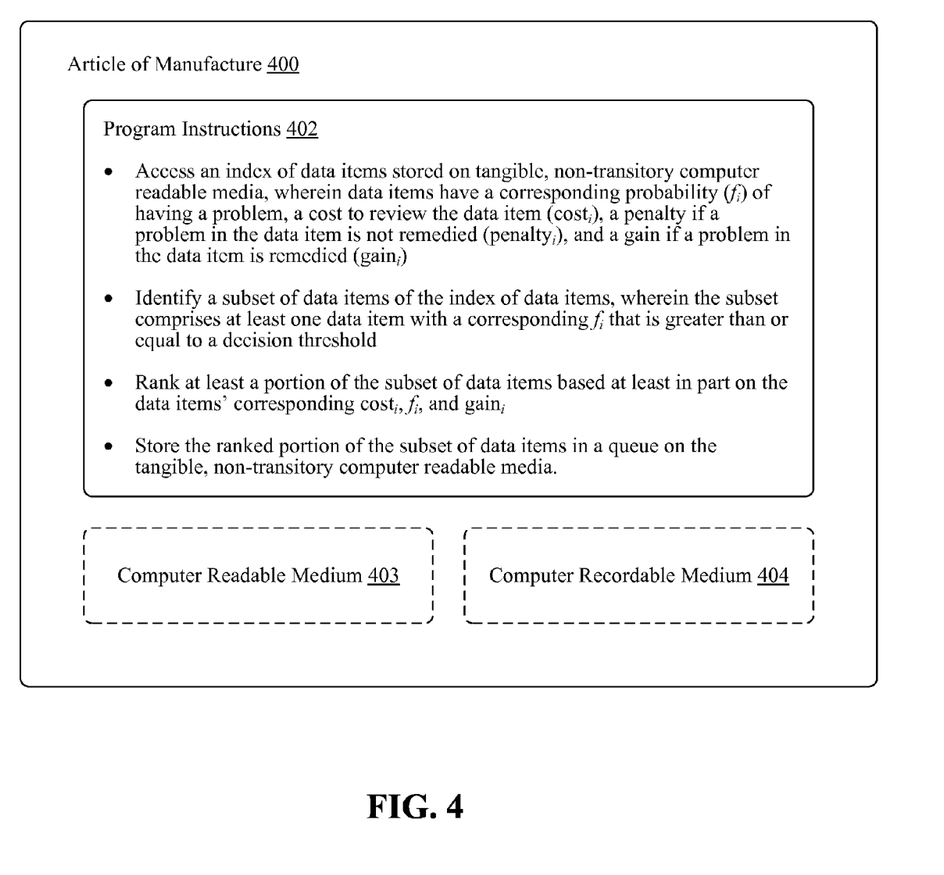
FIG. 4 shows an example computer program product according to one embodiment.

In some embodiments, the disclosed methods and algorithms shown and described herein may be implemented as computer program instructions encoded on a computer-readable media in a machine-readable format. FIG. 4 is a schematic illustrating a conceptual partial view of an example article of manufacture 400 that includes a computer program for executing a computer process on a computing device, arranged according to at least some embodiments described herein.

In some examples, the article of manufacture 400 may include a computer-readable medium 403, such as, but not limited to, a hard disk drive, a Compact Disc (CD), a Digital Video Disk (DVD), a digital tape, memory, etc. In some implementations, the article of manufacture 400 may encompass a computer recordable medium 404, such as, but not limited to, memory, read/write (R/W) CDs, R/W DVDs, etc.

The one or more program instructions 402 may be, for example, computer executable and/or logic implemented instructions. In some examples, a computing device such as the computing devices shown and described in FIGS. 1 and 2A-2B may be configured to provide various operations, functions, or actions to implement the features and functionality of the disclosed systems and methods in response to the program instructions 402 conveyed to system engine 101 by one or more of the computer readable medium 403 or the computer recordable medium 404.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   accessing an index of data items stored on tangible, non-transitory computer readable media, wherein data items have a corresponding probability ($f_i$) of having a problem, a cost to review the data item ($cost_i$), a penalty if a problem in the data item is not remedied ($penalty_i$), and a gain if a problem in the data item is remedied ($gain_i$);
   identifying a subset of data items of the index of data items, wherein the subset comprises at least one data item with a corresponding $f_i$ that is greater than or equal to a decision threshold;
   ranking at least a portion of the subset of data items based at least in part on the data items' corresponding $cost_i$, $f_i$, and $gain_i$; and
   storing the ranked portion of the subset of data items in a queue on the tangible, non-transitory computer readable media.

2. The method of claim 1, wherein an individual data item's decision threshold is based on the individual data item's corresponding $cost_i$, $penalty_i$, and $gain_i$.

3. The method of claim 2, wherein the decision threshold is equal to $cost_i/(penalty_i+gain_i)$.

4. The method of claim 1, wherein ranking at least a portion of the subset of data items based at least in part on the data items' corresponding $cost_i$, $f_i$, and $gain_i$ comprises: assigning corresponding scores to individual data items in the at least a portion of the subset of data items, wherein the corresponding score is equal to $(cost_i)-(f_i)\times(gain_i)$; and ranking the at least a portion of the subset of data items based on the corresponding scores of the data items in the subset.

5. The method of claim 1, wherein a data item's corresponding $cost_i$ is based at least in part on an amount of time for a human reviewer to review the data item.

6. The method of claim 1, wherein at least one data item has a corresponding importance score, prominence score, and corresponding likely problem severity score, and wherein the at least one data item's corresponding $penalty_i$ is based on at least one of the data item's importance score, prominence score, and likely problem severity score, and wherein the at least one data item's corresponding $gain_i$ is based on at least one of the individual data item's importance score and prominence score.

7. The method of claim 1, wherein a data item's corresponding $gain_i$ is based at least in part on expected revenue associated with the data item.

8. The method of claim 1, wherein a data item's corresponding $f_i$ is based on one or more of an indication received from a computing device configured to assign a corresponding $f_i$ to the data item, an indication received from an information system user, and/or an indication received from an assigned human reviewer.

9. The method of claim 1, further comprising updating a first data item's corresponding $f_i$ based on a change in a reference data item's corresponding $f_i$.

10. The method of claim 9, wherein updating the first data item's corresponding $f_i$ based on a change in the reference data item's corresponding $f_i$ comprises:
    receiving one or more of (i) an indication of whether there is a suspected problem associated with the first data item, (ii) an indication of whether there is a suspected problem with the reference data item, and/or (iii) an indication from a human reviewer of whether the reference data item has a problem;
    revising the first data item's $f_i$ based on at least one indication associated with the reference data item and at least one similarity between the reference data item and the first data item; and
    re-ranking at least a portion of the data items in the subset according to the corresponding $cost_i$, $f_i$, and $gain_i$ of the data items based on the revision to the first data item's corresponding $f_i$.

11. The method of claim 10, wherein the one or more similarities between the reference data item and the first data item are based on similarities between metadata associated with the first data item and the reference data item.

12. A system comprising:
    one or more computing devices configured to access an index of data items, wherein individual data items in the index have a corresponding probability ($f_i$) of having a problem, a cost to review the data item ($cost_i$), a penalty if a problem in the data item is not remedied ($penalty_i$), and a gain if a problem in the data item is remedied ($gain_i$),
    wherein the one or more computing devices are further configured to identify a subset of data items of the index, wherein the subset comprises one or more data items having a corresponding $f_i$ that is greater than or equal to a decision threshold, and
    wherein the one or more computing devices are further configured to rank at least a portion of the subset of data items based at least in part on individual data items' corresponding $cost_i$, $f_i$, and $gain_i$, and store the ranked data items in a queue.

13. The system of claim 12, wherein the decision threshold for an individual data item is based on the individual data item's corresponding $cost_i$, $penalty_i$, and $gain_i$.

14. The system of claim 13, wherein an individual data item's corresponding decision threshold is equal to $cost_i/(penalty_i+gain_i)$.

15. The system of claim 12, wherein the one or more computing devices are further configured to assign corresponding scores to individual data items in the at least a portion of the subset of data items, wherein an individual data item's corresponding score is equal to $(cost_i)-(f_i)\times(gain_i)$, and wherein the one or more computing devices are further configured to rank the at least a portion of the subset of data items based on the data items' corresponding scores.

16. The system of claim 12, wherein a data item's corresponding $cost_i$ is based at least in part on an amount of time for a human reviewer to review the data item.

17. The system of claim 12, wherein at least some individual data items have a corresponding importance score, a corresponding prominence score, and corresponding likely problem severity score, wherein an individual data item's corresponding $penalty_i$ is based on at least one of the individual data item's corresponding importance and likely problem severity scores, and wherein an individual data item's corresponding $gain_i$ is based on at least one of the individual data item's corresponding importance, prominence, and likely problem severity scores.

18. The system of claim 12, wherein an individual data item's corresponding $gain_i$ is based at least in part on expected revenue associated with the data item.

19. The system of claim 12, wherein an individual data item's corresponding $f_i$ is based on one or more of an indication received from a computing device configured to assign a corresponding probability of having a problem to a data item, an indication received from an information system user, and/or an indication received from an assigned human reviewer.

20. The system of claim 12, wherein the one or more computing devices are further configured to update a first data item's corresponding $f_i$ based on a change in a reference data item's corresponding $f_j$.

21. The system of claim 20, wherein the one or more computing devices are further configured to receive an indication of whether the reference data item contains an actual or suspected problem, to revise the first data item's $f_i$ based on one or more similarities between the reference data item and the first data item in response to receiving the indication, and to re-rank at least a portion of the data items in the subset according to their corresponding $cost_i$, $f_i$, and $gain_i$ based on the revision to the first data item's corresponding $f_i$.

22. The system of claim 21, wherein the one or more similarities between the reference data item and the first data item are based on similarities between metadata associated with the first data item and the reference data item.

23. An article of manufacture including a tangible computer-readable media having computer-readable instructions encoded thereon, the instructions comprising:

instructions for accessing an index of data items, wherein individual data items in the index have a corresponding probability ($f_i$) of having a problem, a cost to review the data item ($cost_i$), a penalty if a problem in the data item is not remedied ($penalty_i$), and a gain if a problem in the data item is remedied ($gain_i$);

instructions for identifying a subset of data items of the index of data items, wherein the subset comprises at least one data item with a corresponding $f_i$ that is greater than or equal to a decision threshold;

instructions for ranking at least a portion of the subset of data items based at least in part on individual data items' corresponding $cost_i$, $f_i$, and $gain_i$; and instructions for storing the ranked portion of the subset of data items in a queue on the tangible, non-transitory computer readable media.

24. The article of manufacture of claim 23, wherein an individual data item's decision threshold is based on the individual data item's corresponding $cost_i$, $penalty_i$, and $gain_i$.

25. The article of manufacture of claim 24, wherein an individual data item's corresponding decision threshold is equal to $cost_i/(penalty_i+gain_i)$.

26. The article of manufacture of claim 23, wherein the instructions for ranking at least a portion of the subset of data items based at least in part on individual data items' corresponding $cost_i$, $f_i$, and $gain_i$ comprises:

instructions for assigning corresponding scores to individual data items in the at least a portion of the subset of data items, wherein an individual data item's corresponding score is equal to $(cost_i)-(f_i)\times(gain_i)$; and instructions for ranking the at least a portion of the subset of data items based on the corresponding scores.

27. The article of manufacture of claim 23, wherein a data item's corresponding $cost_i$ is based at least in part on an amount of time for a human reviewer to review the data item.

28. The article of manufacture of claim 23, wherein at least some individual data items have a corresponding importance score, a prominence score, and a likely problem severity score, and wherein an individual data item's corresponding $penalty_i$ is based on at least one of the individual data item's importance score and likely problem severity score, and wherein an individual data item's corresponding $gain_i$ is based on at least one of the individual data item's importance score, prominence score, and likely problem severity score.

29. The article of manufacture of claim 23, wherein an individual data item's corresponding $gain_i$ is based at least in part on expected revenue associated with the data item.

30. The article of manufacture of claim 23, wherein an individual data item's corresponding $f_i$ is based on one or more of: (i) an indication of a likely problem received from a computing device configured to assign a corresponding probability of having a problem to the data item; (ii) an indication of a likely problem received from an information system user, and/or (iii) an indication from a human reviewer of whether a related data has been identified as having a problem.

31. The article of manufacture of claim 23, further comprising instructions for updating a first data item's corresponding $f_i$ based on a change in a reference data item's corresponding $f_j$.

32. The article of manufacture of claim 31, wherein the instructions for updating the first data item's corresponding $f_i$ based on a change in the reference data item's corresponding $f_j$ comprises:

instructions for receiving one or more of (i) an indication of whether there is a suspected problem associated with the first data item, (ii) an indication of whether there is a suspected problem with the reference data item, and/or (iii) an indication from a human reviewer of whether the reference data item has a problem;

instructions for revising the first data item's $f_i$ based on at least one indication associated with the reference data item and at least one similarity between the reference data item and the first data item; and instructions for re-ranking at least a portion of the data items in the subset according to the corresponding $cost_i$, $f_i$, and $gain_i$ of the data items based on the revision to the first data item's corresponding $f_i$.

33. The article of manufacture of claim 32, wherein the one or more similarities between the reference data item and the first data item are based on similarities between metadata associated with the first data item and the reference data item.

34. A system comprising:

means for accessing an index of data items, wherein individual data items in the index have a corresponding probability ($f_i$) of having a problem, a cost to review the data item ($cost_i$), a penalty if a problem in the data item is not remedied ($penalty_i$), and a gain if a problem in the data item is remedied ($gain_i$);

means for identifying a subset of data items of the index, wherein the subset comprises data items having a corresponding $f_i$ that is greater than or equal to a decision threshold, wherein the decision threshold for a data item is based on the data item's corresponding $cost_i$, $penalty_i$, and $gain_i$; and means for ranking at least a portion of the subset of data items based at least in part on the corresponding $cost_i$, $f_i$, and $gain_i$ of the data items.

* * * * *